(12) United States Patent
Beckman et al.

(10) Patent No.: US 10,606,878 B2
(45) Date of Patent: Mar. 31, 2020

(54) TECHNOLOGY FOR VISUALIZING CLUSTERS OF ELECTRONIC DOCUMENTS

(71) Applicant: RELATIVITY ODA LLC, Chicago, IL (US)

(72) Inventors: Andrea Beckman, Chicago, IL (US); Shaun McPeck, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 189 days.

(21) Appl. No.: 15/477,735

(22) Filed: Apr. 3, 2017

(65) Prior Publication Data

US 2018/0285453 A1  Oct. 4, 2018

(51) Int. Cl.
*G06F 16/35* (2019.01)
*G06F 16/338* (2019.01)

(52) U.S. Cl.
CPC .......... *G06F 16/358* (2019.01); *G06F 16/338* (2019.01)

(58) Field of Classification Search
CPC ................. G06F 16/358; G06F 16/338; G06F 17/30716; G06F 17/30713; G06F 17/30696
See application file for complete search history.

(56) References Cited

U.S. PATENT DOCUMENTS

| | | | |
|---|---|---|---|
| 5,506,937 A | 4/1996 | Ford et al. | |
| 5,515,488 A * | 5/1996 | Hoppe | G06F 16/26 345/440 |
| 5,619,632 A | 4/1997 | Lamping et al. | |
| 5,794,178 A | 8/1998 | Caid et al. | |
| 5,812,134 A | 9/1998 | Pooser et al. | |
| 5,911,140 A * | 6/1999 | Tukey | G06F 16/355 |
| 5,963,965 A | 10/1999 | Vogel | |
| 6,100,901 A | 8/2000 | Mohda et al. | |
| 6,137,499 A | 10/2000 | Tesler | |
| 6,289,354 B1 * | 9/2001 | Aggarwal | G06F 16/2246 |
| 6,377,287 B1 | 4/2002 | Hao et al. | |

(Continued)

FOREIGN PATENT DOCUMENTS

| | | |
|---|---|---|
| CA | 2556362 A1 | 9/2005 |
| CA | 2556362 C | 10/2012 |
| EP | 1721267 A1 | 11/2006 |

OTHER PUBLICATIONS

Mooi et al., Chapter 9, Cluster Analysis, pp. 237-284, In: Mooi et al., A Concise Guide to Market Research, The Process, Data and Methods Using IBM SPSS Statistics, Springer-Verlag Berlin Heidelberg (2011).

*Primary Examiner* — James E Richardson
(74) *Attorney, Agent, or Firm* — Marshall, Gerstein & Borun LLP; Randall G. Rueth

(57) ABSTRACT

Systems and methods for generating visualizations of a set of processed electronic documents are disclosed. According to certain aspects, a set of clusters may be generated to reflect similarities among content of a set of electronic documents. An electronic device may generate a visualization of the set of clusters, where the visualization may include a set of representations corresponding to the set of clusters. A user interface may display the visualization, where the representations may be positioned to reflect similarities and differences between a set of documents included in a target cluster and additional sets of documents included in additional clusters.

16 Claims, 8 Drawing Sheets

(56) References Cited

U.S. PATENT DOCUMENTS

| | | |
|---|---|---|
| 6,574,632 B2 | 6/2003 | Fox et al. |
| 6,725,217 B2 | 4/2004 | Chow et al. |
| 7,191,175 B2 | 3/2007 | Evans |
| 7,319,999 B2 | 1/2008 | Evans |
| 7,437,370 B1 | 10/2008 | Ershov |
| 7,440,622 B2 | 10/2008 | Evans |
| 7,475,072 B1 | 1/2009 | Ershov |
| 7,627,582 B1 | 12/2009 | Ershov |
| 7,672,950 B2 | 3/2010 | Eckardt, III et al. |
| 7,720,292 B2 | 5/2010 | Evans |
| 7,885,468 B2 | 2/2011 | Evans |
| 7,885,957 B2 | 2/2011 | Evans |
| 7,983,492 B2 | 7/2011 | Evans |
| 8,078,557 B1 | 12/2011 | Ershov |
| 8,155,453 B2 | 4/2012 | Evans |
| 8,229,948 B1 | 7/2012 | Ershov |
| 8,369,627 B2 | 2/2013 | Evans |
| 8,639,044 B2 | 1/2014 | Evans |
| 8,792,733 B2 | 7/2014 | Evans |
| 8,935,251 B2 | 1/2015 | Evans |
| 8,942,488 B2 | 1/2015 | Evans |
| 8,949,253 B1 * | 2/2015 | Jing ................. G06K 9/6201 707/749 |
| 9,082,232 B2 | 7/2015 | Evans |
| 2005/0182764 A1 | 8/2005 | Evans |
| 2005/0192956 A1 * | 9/2005 | Evans ............ G06F 16/24578 |
| 2005/0289100 A1 * | 12/2005 | Dettinger ............ G06F 16/2425 |
| 2006/0164409 A1 * | 7/2006 | Borchardt ........... G06F 3/04815 345/419 |
| 2007/0185866 A1 | 8/2007 | Evans |
| 2007/0192281 A1 | 8/2007 | Cradick et al. |
| 2008/0114763 A1 | 5/2008 | Evans |
| 2008/0208847 A1 * | 8/2008 | Moerchen ............ G06F 16/338 |
| 2008/0243482 A1 * | 10/2008 | Skubacz ............ G06F 17/2785 704/9 |
| 2008/0263022 A1 * | 10/2008 | Kostorizos ........... G06F 16/954 |
| 2009/0046100 A1 | 2/2009 | Evans |
| 2010/0106752 A1 | 4/2010 | Eckardt, III et al. |
| 2010/0220112 A1 | 9/2010 | Evans |
| 2010/0313157 A1 * | 12/2010 | Carlsson ............... G06F 16/287 715/769 |
| 2011/0097001 A1 * | 4/2011 | Labbi .................. G06K 9/6219 382/225 |
| 2011/0122151 A1 | 5/2011 | Evans |
| 2011/0125751 A1 | 5/2011 | Evans |
| 2011/0202886 A1 * | 8/2011 | Deolalikar ........... G06F 16/353 715/853 |
| 2011/0264998 A1 | 10/2011 | Evans |
| 2012/0201473 A1 | 8/2012 | Evans |
| 2012/0221553 A1 * | 8/2012 | Wittmer ................. G06F 16/26 707/722 |
| 2013/0013612 A1 * | 1/2013 | Fittges ................. G06F 16/353 707/739 |
| 2013/0046763 A1 * | 2/2013 | Sinclair ............... H04L 63/1416 707/737 |
| 2013/0138642 A1 | 5/2013 | Evans |
| 2013/0148905 A1 | 6/2013 | Evans |
| 2014/0140631 A1 | 5/2014 | Evans |
| 2014/0333630 A1 | 11/2014 | Evans |
| 2015/0127651 A1 | 5/2015 | Evans |
| 2015/0138207 A1 | 5/2015 | Evans |
| 2015/0220647 A1 * | 8/2015 | Gangwani ............ G06F 16/358 707/731 |

* cited by examiner

TECHNOLOGY FOR VISUALIZING CLUSTERS OF ELECTRONIC DOCUMENTS

FIELD

The present disclosure is directed to technology for visualizing clusters of electronic documents. More particularly, the present disclosure is directed to systems and methods for analyzing relationships among clusters of electronic documents and displaying the relationships in various manners.

BACKGROUND

There is a vast amount of electronic documents that are created and stored on a daily basis. In order for the documents to be searchable, content from the documents is often extracted, catalogued, and organized in a centralized database. In some implementations, documents may be organized into clusters of documents, where each cluster includes documents having the same or similar attribute(s), such as an overall topic. Document organization is helpful for many purposes. For example, the discovery phase of a lawsuit may involve the review of millions of documents, where the amount of time needed to review the documents is significantly reduced when the documents are organized according to some scheme.

However, even when the documents are organized (e.g., into clusters), it may prove difficult to ascertain which documents may be relevant to a particular query and/or which groups of documents may be similar to other groups of documents. In particular, a user may wish to identify only a few clusters, out of many, that may be relevant to a query. However, current technologies are limited in their abilities to effectively and accurately generate visualizations that depict similarities among documents, and in particular, depict similarities among multiple clusters of documents.

Accordingly, there is an opportunity for systems and methods to analyze electronic documents and generate visualizations of similarities among clusters of the documents.

SUMMARY

According to embodiments, a computer-implemented method of generating data visualizations is provided. The method may include accessing a set of clusters, wherein each of the set of clusters includes a portion of a set of electronic documents, and displaying, in a user interface, a first representation of a first cluster of the set of clusters, the first representation having a first size indicative of an amount of the portion of the set of electronic documents included in the first cluster. The method may further include displaying, in the user interface, a second representation of a second cluster of the set of clusters, the second representation having a second size indicative of an amount of the portion of the set of electronic documents included in the second cluster, the second representation displayed a first distance from the first representation, the first distance representative of a similarity between the portion of the set of electronic documents included in the first cluster and the portion of the set of electronic documents included in the second cluster; and displaying, in the user interface, a third representation of a third cluster of the set of clusters, the third representation having a third size indicative of an amount of the portion of the set of electronic documents included in the third cluster, the third representation displayed a second distance from the first representation, the second distance representative of a similarity between the portion of the set of electronic documents included in the first cluster and the portion of the set of electronic documents included in the third cluster.

In another embodiment, a system configured to generate data visualizations is provided. The system may include a user interface, a memory configured to store non-transitory computer executable instructions, and a processor interfacing with the user interface and the memory. The processor may be configured to execute the non-transitory computer executable instructions to cause the processor to access a set of clusters, wherein each of the set of clusters includes a portion of a set of electronic documents, and cause the user interface to display a first representation of a first cluster of the set of clusters, the first representation having a first size indicative of an amount of the portion of the set of electronic documents included in the first cluster. The processor may be further configured to cause the user interface to display a second representation of a second cluster of the set of clusters, the second representation having a second size indicative of an amount of the portion of the set of electronic documents included in the second cluster, the second representation displayed a first distance from the first representation, the first distance representative of a similarity between the portion of the set of electronic documents included in the first cluster and the portion of the set of electronic documents included in the second cluster, and cause the user interface to display a third representation of a third cluster of the set of clusters, the third representation having a third size indicative of an amount of the portion of the set of electronic documents included in the third cluster, the third representation displayed a second distance from the first representation, the second distance representative of a similarity between the portion of the set of electronic documents included in the first cluster and the portion of the set of electronic documents included in the third cluster.

DETAILED DESCRIPTION

The present embodiments may relate to, inter alia, technology for generating visualizations of representations of electronic document clusters. According to certain aspects, the visualizations include depictions of similarities among the document clusters, where the similarities may be depicted according to various conventions and techniques. In this regard, a user who accesses the visualizations may efficiently and effectively deduce the similarities, and effectively and effectively identify document clusters which may be relevant to an analysis or query.

The systems and methods discussed herein therefore offer numerous benefits. In addition to generating visualizations from which conclusions are easy to infer, the systems and methods may enable users to modify the visualizations according to certain selections. Accordingly, the time required for users to identify relevant document clusters may be reduced, which not only saves time but may also reduce any costs associated with document identification and review. Further, the systems and methods may increase the probability that users identify documents that are relevant to a search or review. It should be appreciated that other benefits are envisioned.

The systems and methods discussed herein address a challenge related to improving how users identify and access relevant electronic documents for review and assessment. In conventional implementations, users must manually review individual documents or attempt to draw conclusions from ineffectively-organized documents. In contrast, the systems and methods utilize automatic generation of document clusters and automatic generation of visualizations that efficiently and effectively present the document clusters for review, selection, and modification by users.

Therefore, the systems and methods do not merely recite the performance of some business practice known from the pre-Internet world (performing electronic document review and assessment) along with the requirement to perform it on the Internet. Instead, the systems and methods are necessarily rooted in computer technology in order to overcome a problem specifically arising in computer networks.

Figure 1:
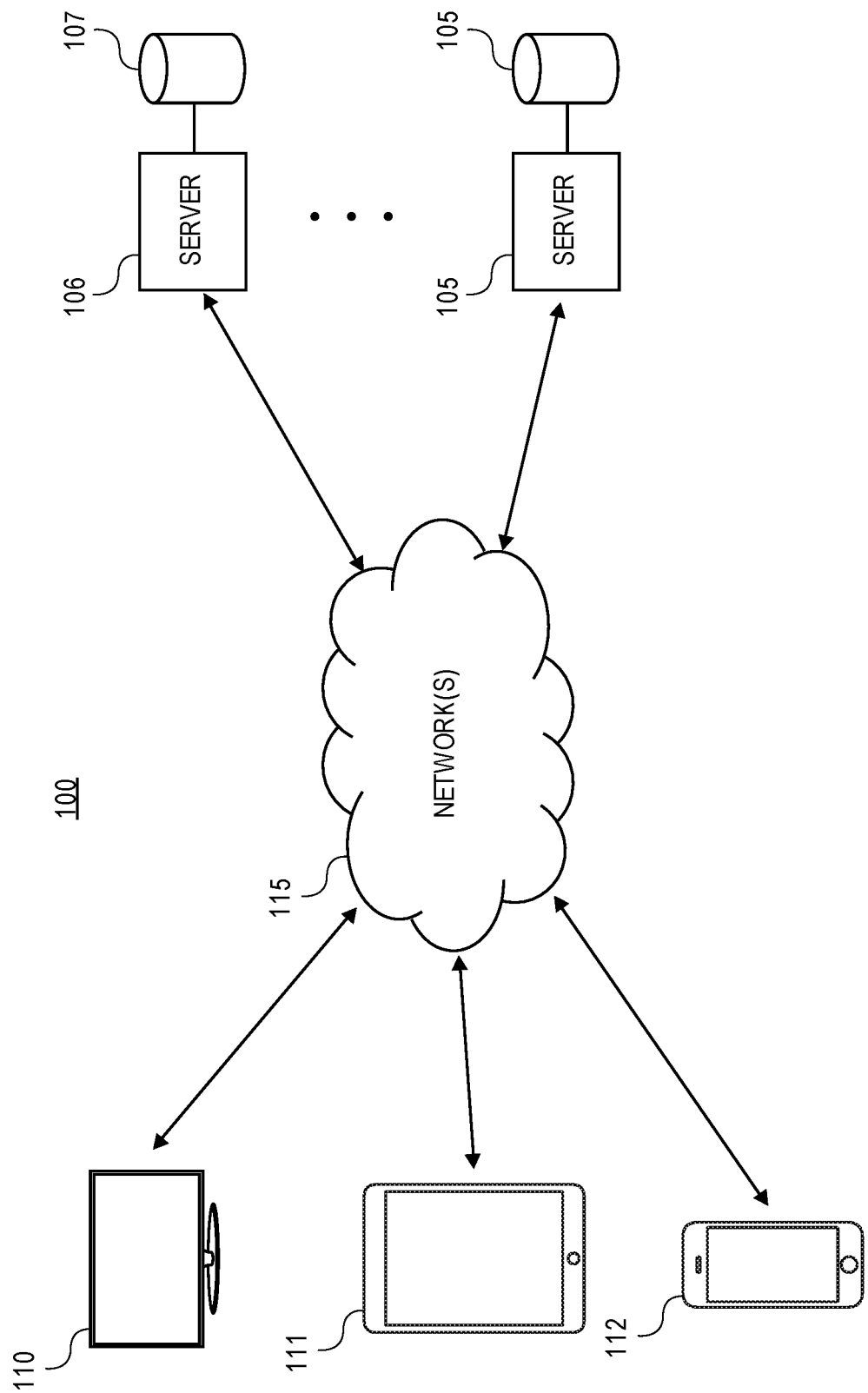
FIG. 1 depicts an overview of an exemplary system of components configured to generate and present visualizations of electronic documents, in accordance with some embodiments.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 includes a set of servers 104, 106 each coupled to a respective database 105, 107. Although FIG. 1 depicts two (2) servers and two (2) databases, it should be appreciated that other amounts of servers and databases are appreciated. According to embodiments, each of the servers 104, 106 may be configured to analyze a set of electronic documents (e.g., e-mails, or other text- and/or visual-based electronic documents) according to the content included in the set of electronic documents. In particular, each of the server 104, 106 may identify a set of terms that are included in the set of electronic documents, determine or calculate similarities among the set of terms, determine a set of groupings of the set of terms based on the similarities, and generate a set of clusters corresponding to the set of groupings, where each cluster may include a corresponding portion of the set of electronic documents.

Each of the databases 105, 107 may be configured to store the electronic documents (or portions thereof), as well as data indicative of the similarities and the set of groupings and clusters. Although not depicted in FIG. 1, it should be appreciated that the servers 104, 106 may interface with additional components or sources. In particular, the servers 104, 106 may access or receive the set of electronic documents from an external source (e.g., an e-mail server of a company).

The system 100 further includes a set of electronic devices 110, 111, 112. Although FIG. 1 depicts three (3) electronic devices, it should be appreciated that other amounts of electronic devices are appreciated. Each of the electronic devices 110, 111, 112 may be any type of electronic device such as a mobile device (e.g., a smartphone), notebook computer, desktop computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like.

The set of electronic devices 110, 111, 112 may communicatively connect to the servers 104, 106 via one or more networks 115. In certain embodiments, the network(s) 115 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

In operation, the set of electronic devices 110, 111, 112 may retrieve or access data available to the servers 104, 106 and/or stored in the databases 105, 107. In particular, the servers 104, 106 may generate visualizations of various portions of the data (e.g., the determined clusters of the set of electronic documents), and provide the visualizations to the electronic devices 110, 111, 112, where the electronic devices 110, 111, 112 may be configured to present the visualizations to respective users, such as via a user interface. In an implementation, each of the set of electronic devices 110, 111, 112 may support execution of an application configured to receive selections from the respective user, generate requests to send to the servers 104, 106, generate interfaces to display the visualizations, and generally perform operations to support the systems and methods as discussed herein.

Although the embodiments herein describe the servers 104, 106 performing the electronic document processing and visualization generation, among other functionalities, it should be appreciated that the electronic devices 110, 111, 112 may perform or facilitate these functionalities. In particular, the electronic devices 110, 111, 112 may retrieve any relevant information (e.g., a set of electronic documents) from the servers 104, 106 (which may be stored on the databases 105, 107), process the retrieved information accordingly, and facilitate various functionalities of the systems and methods.

Figure 2:
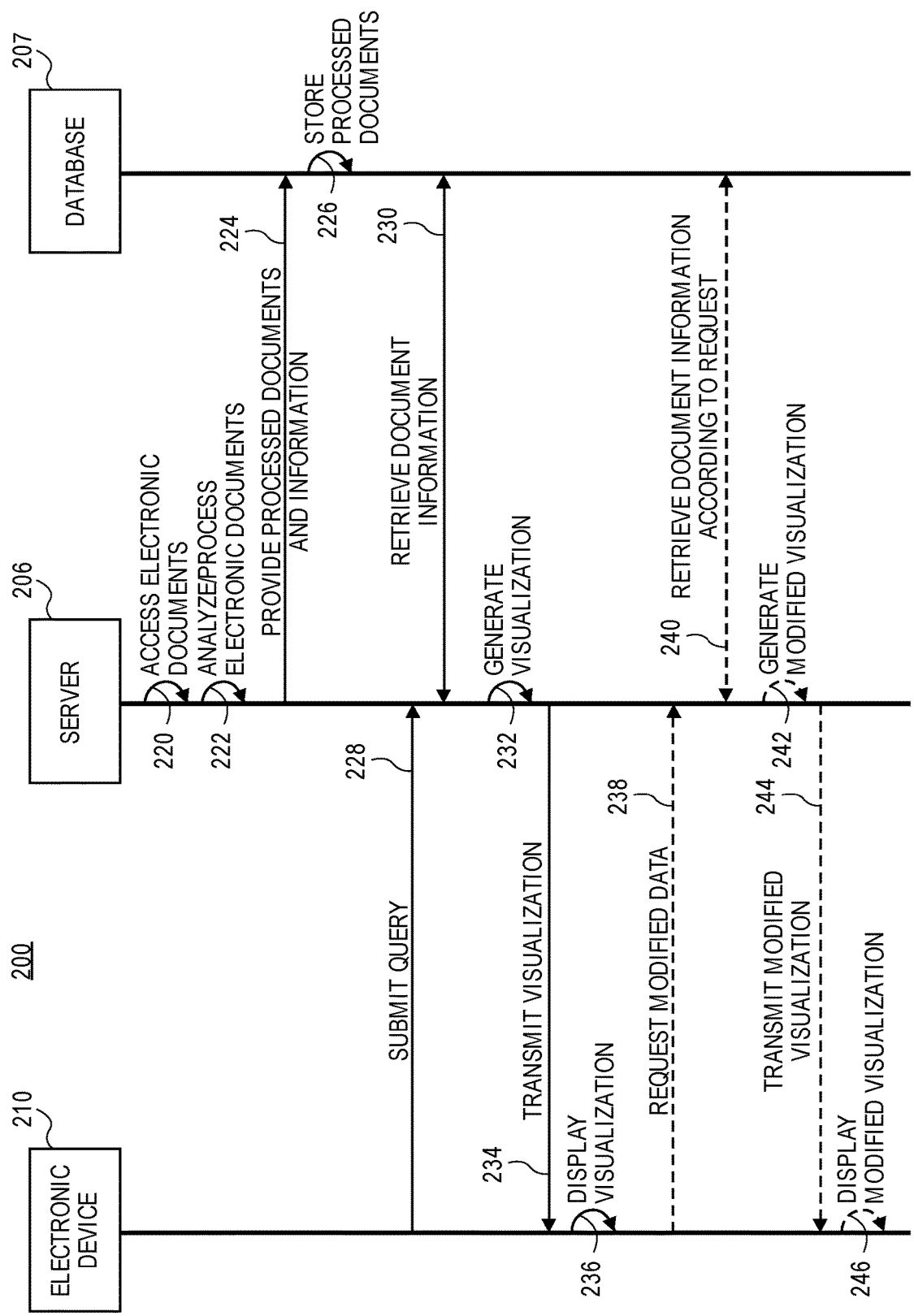
FIG. 2 depicts an exemplary signal diagram associated processing electronic documents, generating visualizations of the electronic documents, and presenting the visualizations, in accordance with some embodiments.

FIG. 2 depicts a signal diagram 200 associated with certain functionalities related to analyzing electronic documents, generating visualizations of the electronic documents, and displaying the visualizations. The signal diagram 200 includes various components including: an electronic device 210 (such as any of the electronic devices 110, 111, 112 as discussed with respect to FIG. 1), a server 206 (such as either of the servers 104, 106 as discussed with respect to FIG. 1), and a database 207 (such as either of the databases 105, 107 as discussed with respect to FIG. 1).

The signal diagram 200 may begin when the server 206 accesses (220) a set of electronic documents. In embodiments, the set of electronic documents may be stored by the database 207, the server 206 may receive the set of electronic documents from an external source, or the server 206 may access the set of electronic documents from another source. The set of electronic documents may include any type of electronic document that may include any combination of textual and visual content, in any type format, and that may be capable of being analyzed, processed, indexed, or the like. For example, the server 206 may receive a set of e-mails associated with a company in advance of a discovery phase of a lawsuit.

The server 206 may analyze or process (222) the set of electronic documents. In particular, the server 206 may perform any type of indexing, processing, or analysis technique on the set of electronic documents, such that the set of electronic documents is organized according to the content included in the set of electronic documents, or according to other parameters.

In one implementation, the server 206 may perform an optical character recognition (OCR) technique, or similar type of extracting technique, on the set of electronic documents to identify and extract any machine-encoded content that may be included in the set of electronic documents. Further, the server 206 may analyze the set of electronic documents (and/or the machine-ended content thereof) to identify a set of terms that are included in the set of electronic documents. Additionally, the server 206 may calculate or determine similarities among the set of terms and may determine a set of groupings of the set of terms based on the similarities. In particular, the server 206 may determine terms that may be related to the same topics, may include the same term or set of terms, or may have the same meaning (e.g., using natural language processing, latent semantic indexing, or the like).

For example, the server 206 may determine that the following terms are similar and thus belong in a grouping: football, baseball, basketball, golf, sports, game, and match; and may also determine that the following terms are similar and thus belong in another grouping: IPO, round of funding, quiet period, investor roadshow, financial disclosure, and SEC. It should be appreciated that each of the set of terms may include single words or terms, or phrases that include multiple words or terms. Further, it should be appreciated that the server 206 may consider other criterion for identifying terms, calculating similarities among the terms, and determining the set of groupings.

In analyzing or processing the set of electronic documents, the server 206 may further generate a set of clusters corresponding to the set of groupings, where each of the set of clusters may include a portion of the set of electronic documents according to a respective grouping of the set of groupings. To continue with the above example, one cluster may include any of the set of electronic documents that include any of the following terms: football, baseball, basketball, golf, sports, game, and match; and another cluster may include any of the set of electronic documents that may include any of the following terms: IPO, round of funding, quiet period, investor roadshow, financial disclosure, and SEC.

It should be appreciated that the clusters may include distinct portions of the set of electronic documents (i.e., a single electronic document is generally not included in more than one cluster). Further, it should be appreciated that each of the set of clusters may have one or more sub-clusters that may each be reflective of additional grouping(s), within the cluster, based on similarity criteria of the corresponding electronic documents.

The server 206 may provide (224) the set of electronic documents and information relating to the analysis and processing thereof (e.g., identifications of the set of clusters) to the database 207, which may store (226) the electronic documents and the associated information. In particular, the database 207 may store the set of electronic documents as well as any processing information relating thereto, such as indications or identifications of the set of clusters of the set of electronic documents.

It should be appreciated that the database 207 may be configured to store the data according to various storage techniques. In an implementation, the calculated similarities among the set of clusters may be stored as distance data that the database 207 may store in an end-by-end matrix. Accordingly, the server 206 need not calculate the similarities on subsequent data accesses. Further, in an implementation, the database 207 may be at least partially in the form of cache memory that may store any portion(s) of the data and that may enable the server 206 to effectively and efficiently retrieve any relevant portion(s) of the data according to any type of query.

At a certain point, the electronic device 210 may submit (228) a query for or otherwise request electronic documents, where the query may specify a set of parameters. In some implementations, the query may indicate a search term or phrase that is desired by a user of the electronic device 210 (e.g., "finance" or "injury"). In other implementations, the request may indicate a general search for the clusters of the set of electronic documents, where the general search may optionally indicate a similarity value and/or a depth value. The similarity value may be reflective of the degree to which retrieved clusters may be similar, and the depth value may specify how many sub-clusters of each cluster to retrieve, if available.

The server 206 may receive the query and may retrieve (230) information corresponding to at least a portion of the set of electronic documents according to the query. In particular, the server 206 may forward the query to the database 207, which may provide the relevant information to the server 206 according to the query. After retrieving the relevant information according to the query, the server 206 may generate (232) a visualization that depicts at least one cluster of at least a portion of the electronic documents. For example, if the query specifies a search term "finance," the server 206 may retrieve any clusters that are relevant to finance, and may generate a visualization that may depict the clusters and indicate respective sets of electronic documents that may be included in the clusters.

In an embodiment, the visualization may include data relating to how the visualization may be displayed. In particular, the data may indicate a size of each cluster, a color of each cluster, a style of each cluster (e.g., levels of transparency), any textual content (e.g., terms that may be prevalent within or related to each cluster), and/or other data. The server 206 may transmit (234) data associated with the visualization to the electronic device 210.

After receiving the data associated with the visualization, the electronic device 210 may display (236) the visualization according to the received information, in particular via a user interface, so that a user of the electronic device 210 may review the visualization and make certain selections. In embodiments, the electronic device 210 may display each of the clusters as a graphical representation. For example, each of the plurality of clusters may be represented as a circle (or another shape), where a size of the circle may be indicative of the number of documents included in that cluster (i.e., the larger the cluster, the larger the circle). In an embodiment, the cluster representation may indicate a percentage breakdown of which electronic documents are accounted for (i.e., processed) within the cluster and which electronic documents are not accounted for within the cluster.

Further, in displaying the visualization, the electronic device 210 may indicate how similar multiple document clusters are to each other. In a particular embodiment, the electronic device 210 may display a first cluster as the "center" or "target" cluster, and may display at least two additional clusters a distance away from the first cluster, where the respective distances between the additional clusters and the center cluster may be indicative of the similarity between the respective additional cluster and the center cluster (i.e., the closer the distance, the more similar the clusters). Further, in an embodiment, each of the additional clusters may have an associated shading level that may be reflective of that number of documents in that cluster that are responsive to a query. In an additional embodiment, any additional cluster that includes a "hit" (i.e., an electronic document(s) that matches a query or otherwise the electronic document(s) of the center cluster) may be a certain color; and any cluster that does not include a hit may be another color. Because the visualization includes a center cluster and at least two additional clusters, a user is able to efficiently and effectively gauge the similarity levels among the displayed clusters.

In embodiments, the electronic device 210 may display connector objects between the clusters. For example, the electronic device 210 may display a line between the center cluster and each of the additional clusters. In an implementation, the electronic device 210 may also indicate, in the display, a set of words or terms that are associated with each of the clusters. In this regard, the user may effectively and efficiently ascertain the general content or nature of a given cluster. It should be appreciated that the electronic device 210 may display alternative and additional content and information.

In some implementations, the user may use the electronic device 210 to make certain selections and/or request modifications of the visualization. In particular, the user may modify any one of a similarity value, a depth value, and/or any other parameters. The electronic device 210 may accordingly transmit (238) the modification request to the server 206, and the server 206 may retrieve (240) relevant information and data according to the modification request.

The server 206 may also generate (242) a modified visualization according to the modification request. The server 206 may transmit (244) the modified visualization to the electronic device 210, and the electronic device 210 may display (246) the modified visualization to reflect the user-specified selections.

Figure 3:
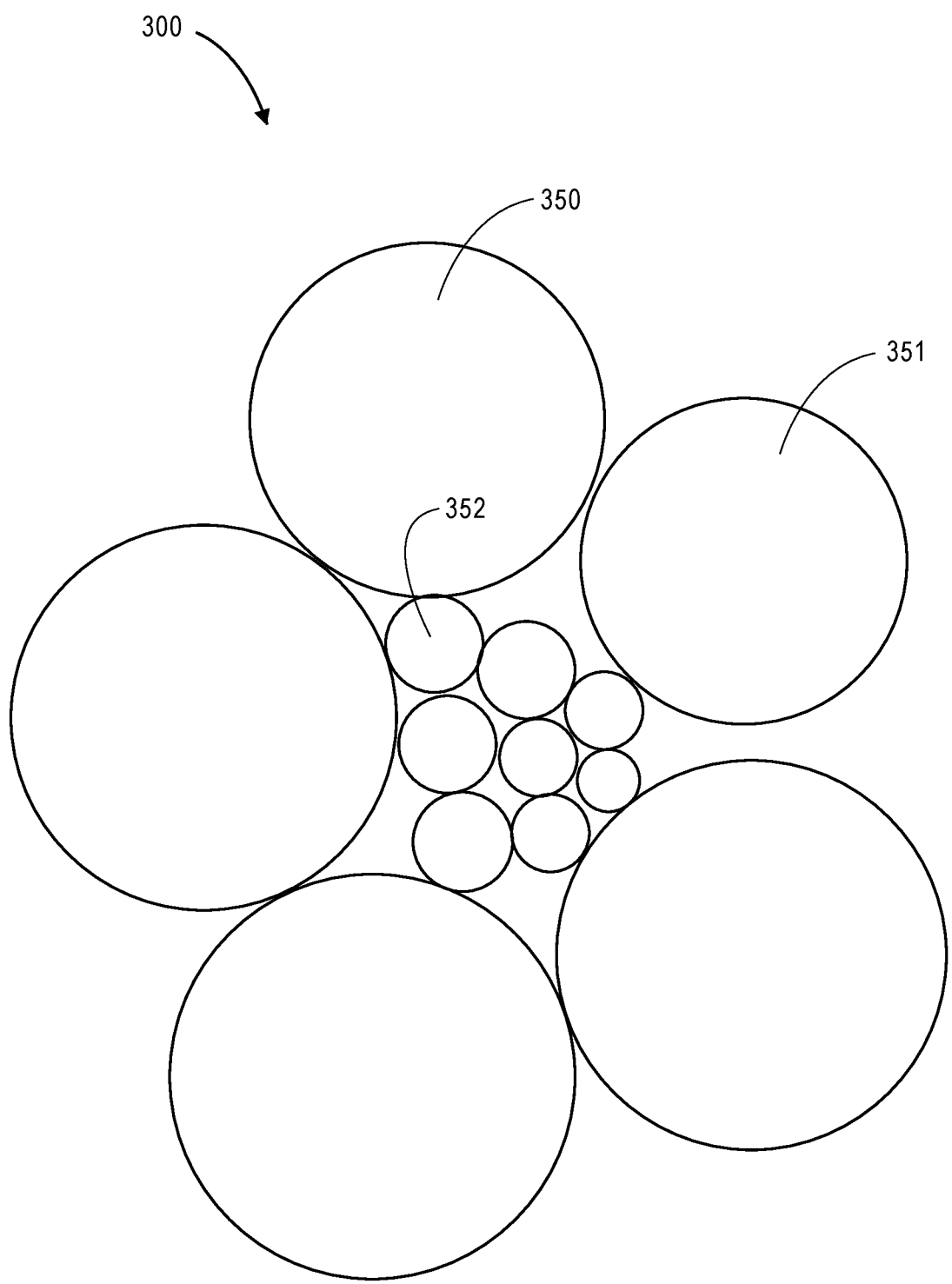
FIG. 3 depicts a known version of a data visualization, in accordance with some embodiments.

FIG. 3 depicts a visual representation 300 of a set of clusters that is generated from content included in a set of electronic documents. The visual representation 300 is an example of a known representation of a set of clusters, where an electronic device may display the visual representation 300 via a user interface. Each of the set of clusters in the visual representation 300 is representative of a portion of the set of electronic documents, where the portions of the set of electronic documents may be determined or identified from an analysis of the set of documents, as discussed herein. Further, each of the set of clusters in the visual representation 300 is represented as a circle object. For example, the visual representation 300 indicates clusters 350, 351, 352, and additional clusters. Each of the clusters 350, 351, 352 and the additional clusters has a size that is representative of an amount of the electronic documents that are included within the respective cluster. In particular, the larger the depicted cluster, the more electronic documents that are associated with that cluster (and vice-versa).

However, the visual representation 300 is limited. In particular, a user who views the visual representation 300 is unable to effectively ascertain similarities or differences among the clusters. Although the clusters 350, 351, 352 and the additional clusters may display words or terms that are associated with or relevant to the particular cluster, the user must view the terms and attempt to manually deduce the degree of similarity among the terms, which may not result in an accurate assessment because the terms are merely representative and because reconciling the meaning of several terms associated with several clusters is difficult.

In embodiments, one or more of the clusters 350, 351, 352 or the additional clusters may have at least one associated "sub-cluster" or "child" cluster that may represent an additional organization of the portion of the set of documents within the respective cluster. In an implementation, the visual representation 300 may enable the user to select one of the clusters 350, 351, 352 or the additional clusters, or a sub-cluster thereof, for example via a "right click" selection, upon which the user interface may display a menu of available selections. One of the selections may be a selection to view clusters similar to that of the selected cluster (e.g., "View Nearby Clusters"). For example, the user may select to view clusters similar to the cluster 350.

Figure 4A:
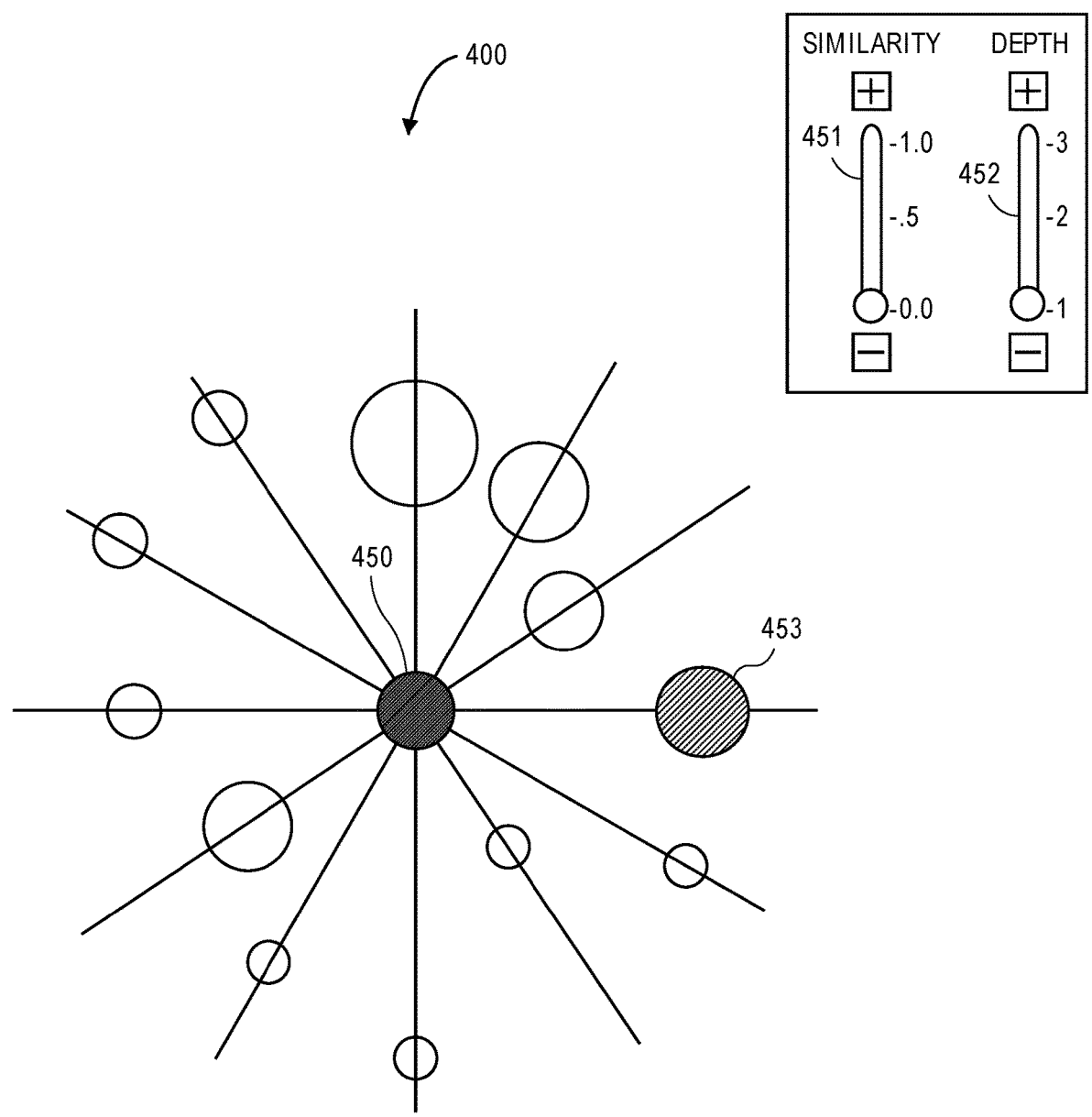
FIGS. 4A-4C depict various data visualizations, in accordance with some embodiments.

In response to the user selecting to view clusters similar to a given cluster (e.g., the cluster 350 of FIG. 3), the electronic device may display, in the user interface, a visual representation 400 as depicted in FIG. 4A. Generally, the visual representation 400 visually depicts clusters and degrees of similarities among the clusters. It should be appreciated that the electronic device may display the visual representation 400 in response to other triggers or selections.

According to embodiments, the visual representation 400 may include a center cluster 450 that may be the "subject" or "target" cluster for the similarity assessment, where the center cluster 450 may be displayed in a center portion of the user interface. The visual representation 400 may depict additional clusters that may at least partially surround the center cluster 450. According to embodiments, each of the additional clusters may be displayed a specified distance from the center cluster 450, where the specified distance of a given cluster may be representative of a similarity between a set of electronic documents included in the given cluster and a set of electronic documents included in the center cluster 450. For example, the distance between the center cluster 450 and a cluster 451 represents the similarity between a set of electronic documents included in the center cluster 450 and a set of electronic documents included in the cluster 451.

Generally, there may be multiple additional clusters that at least partially surround the center cluster 450, where each of the multiple additional clusters are displayed a specified distance from the center cluster 450. Accordingly, a user who views the visual representation 400 may be able to effectively and efficiently assess how similar the set of electronic documents included in the center cluster 450 are to those of each of the multiple additional clusters. In this regard, the user is able to effectively and efficiently identify clusters that include electronic documents that may be relevant to a query (i.e., the additional clusters that are most similar to the center cluster 450), as well as effectively and efficiently ascertain, from the size of a given cluster, the amount of electronic documents included in the given cluster.

It should be appreciated that additional information, formats, and other display elements are envisioned. In an implementation, the visual representation 400 may include words or terms that are relevant to a given cluster, for example displayed around a perimeter of the visual representation 400. For example, if a given cluster includes documents that are related to a company's trademarks, then the terms may include "trademark," "registered," "first use," "similarity," "USPTO," and "secondary meaning." In another implementation, the visual representation 400 may depict elements that enhance the ability of a user to ascertain the similarities among clusters. For example, the visual representation 400 may include a grid-like system of lines, where the lines may be drawn as co-centric circles with a center point as the center cluster 450, as well as radial lines drawn from the center cluster 450 through the additional clusters.

The additional clusters of the visual representation 400 may also have a certain shading effect that may be representative of how many, or a percentage, or electronic documents included in a particular cluster are hits for a particular query. As depicted in FIG. 4A, an additional cluster 453 may be shaded a certain degree which may indicate a certain amount or percentage of the electronic documents that are hits for a query. For example, if the query is "finance," the level of shading of the additional cluster 453 may be representative of the amount or percentage of electronic documents that include content related to finance. As a result, a user who views the visual representation 400 is able to effectively assess, based on the shading, which of the additional clusters may be related to a particular query, as well as a set of additional clusters that may have a similar relevance to the particular query.

Figure 4B:
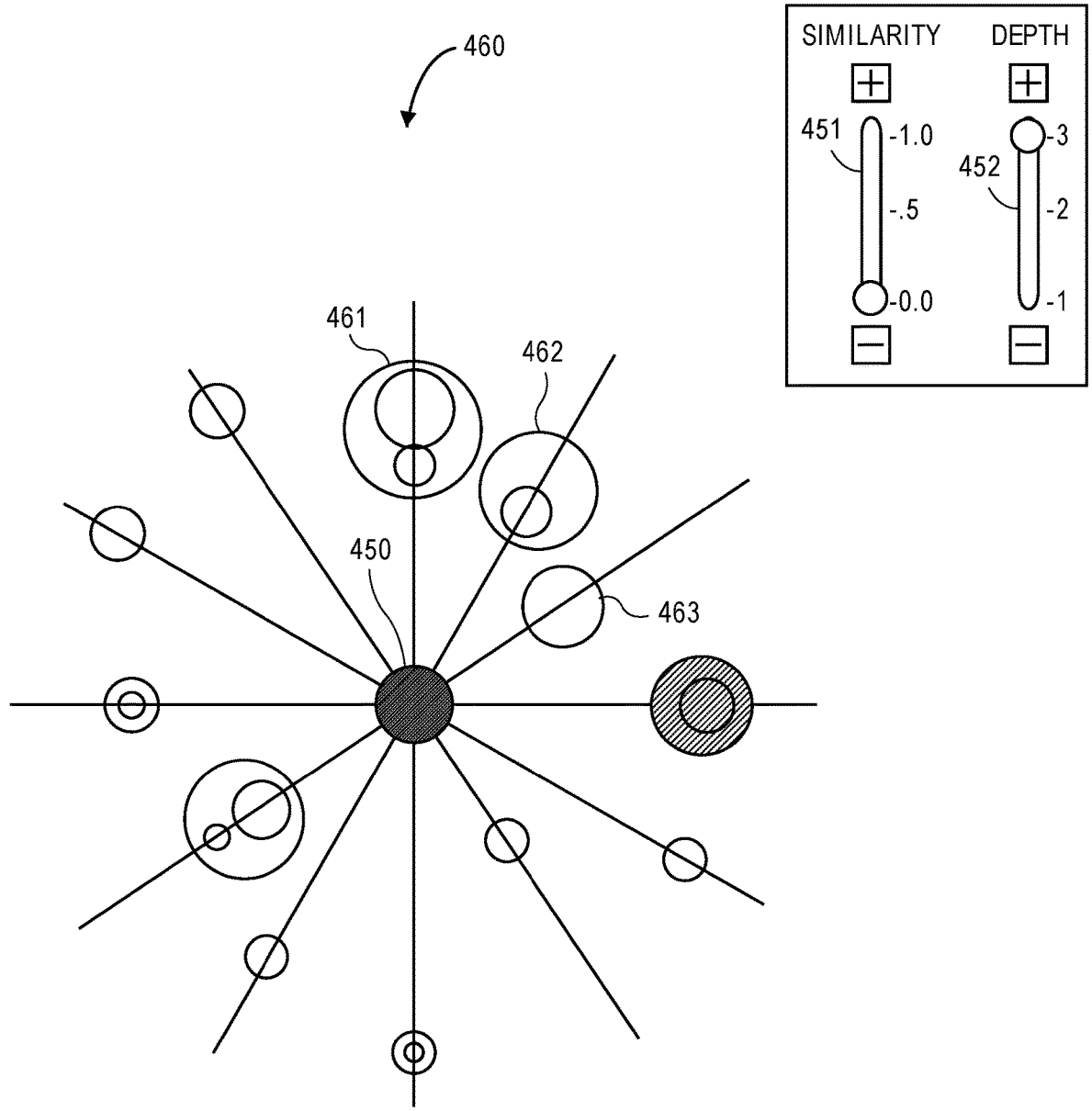

The visual representation 400 may enable the user to adjust a similarity metric (451) and a depth metric (452). FIG. 4B depicts a visual representation 460 that is reflective of the user adjusting the depth metric 452 to a value of "3." In response to the user adjusting the depth metric 452 to a value of "3," the system may determine a set of sub-clusters of the additional clusters, where the sub-clusters may be included as part of a hierarchical data structure. In particular, when the depth metric 452 is set to a value of "3," the system may determine sub-clusters that are included in up to two additional "sub-layers" of the hierarchical data structure.

The visual representation 460 depicts the sub-clusters of the additional clusters that are depicted in the visual representation 400 of FIG. 4A. In particular, an additional cluster 461 may include two sub-clusters and an additional cluster 462 may include a single sub-cluster. In certain scenarios, an additional cluster may not include any sub-clusters (e.g., an additional cluster 463 does not have any sub-clusters). As depicted in FIG. 4B, the visual representation 460 may depict the sub-clusters as concentric (or eccentric) with the associated additional clusters.

Figure 4C:
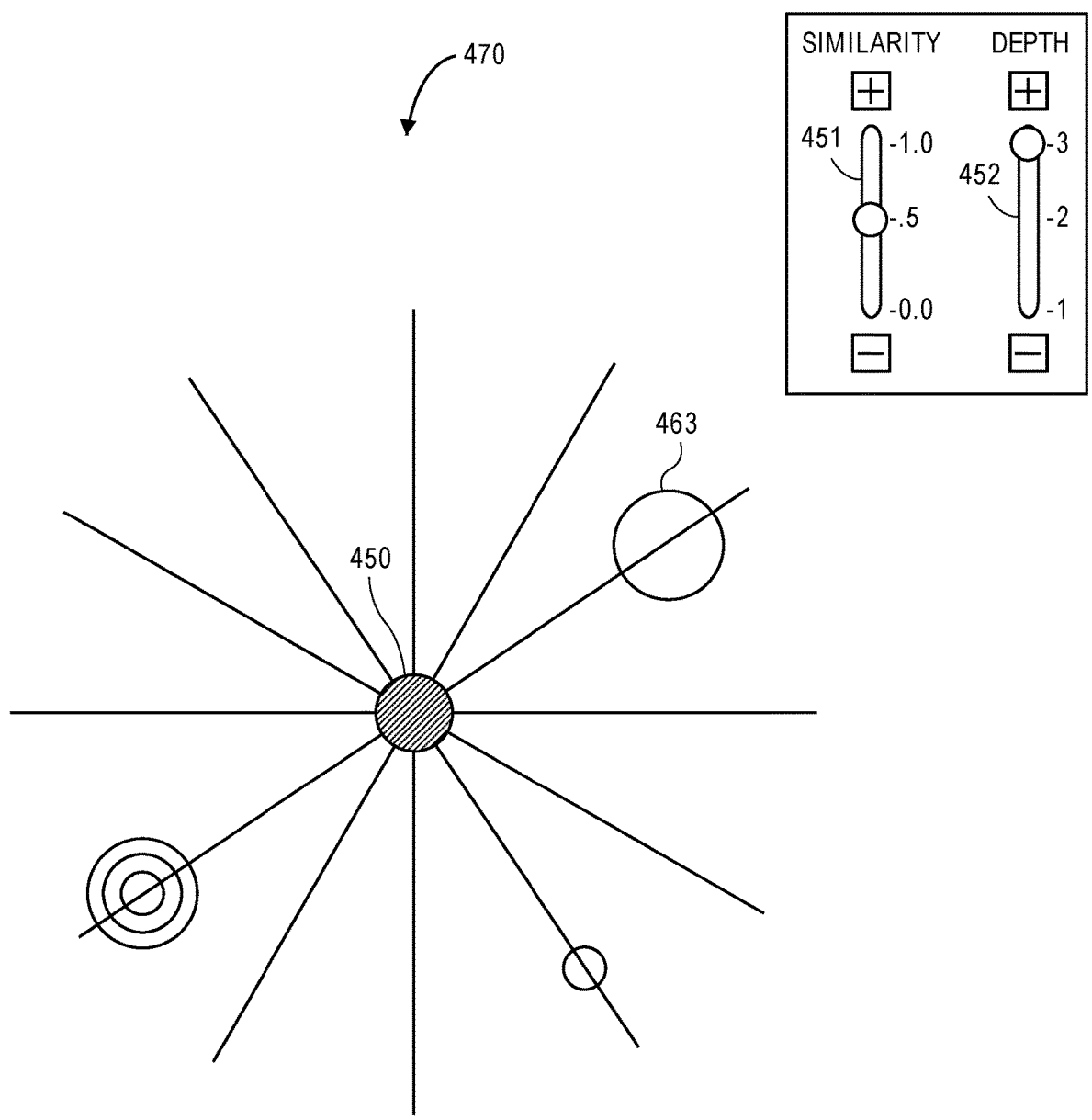

FIG. 4C depicts a visual representation 470 that is reflective of the user adjusting the similarity metric 451 to a value of "0.5." In response to the user adjusting the similarity metric 451 to a value of "0.5," the visual representation 470 may update to include clusters that are relatively more similar to the center cluster 450, and exclude clusters that are relatively less similar to the center cluster 450, thus mimicking a "zoom in" effect. In particular, the visual representation 470 includes the additional cluster 463 (among other additional clusters) and excludes the additional clusters 461, 462 because the additional cluster 463 is more similar to the center cluster 450 than are the additional clusters 461, 462.

Figure 5:
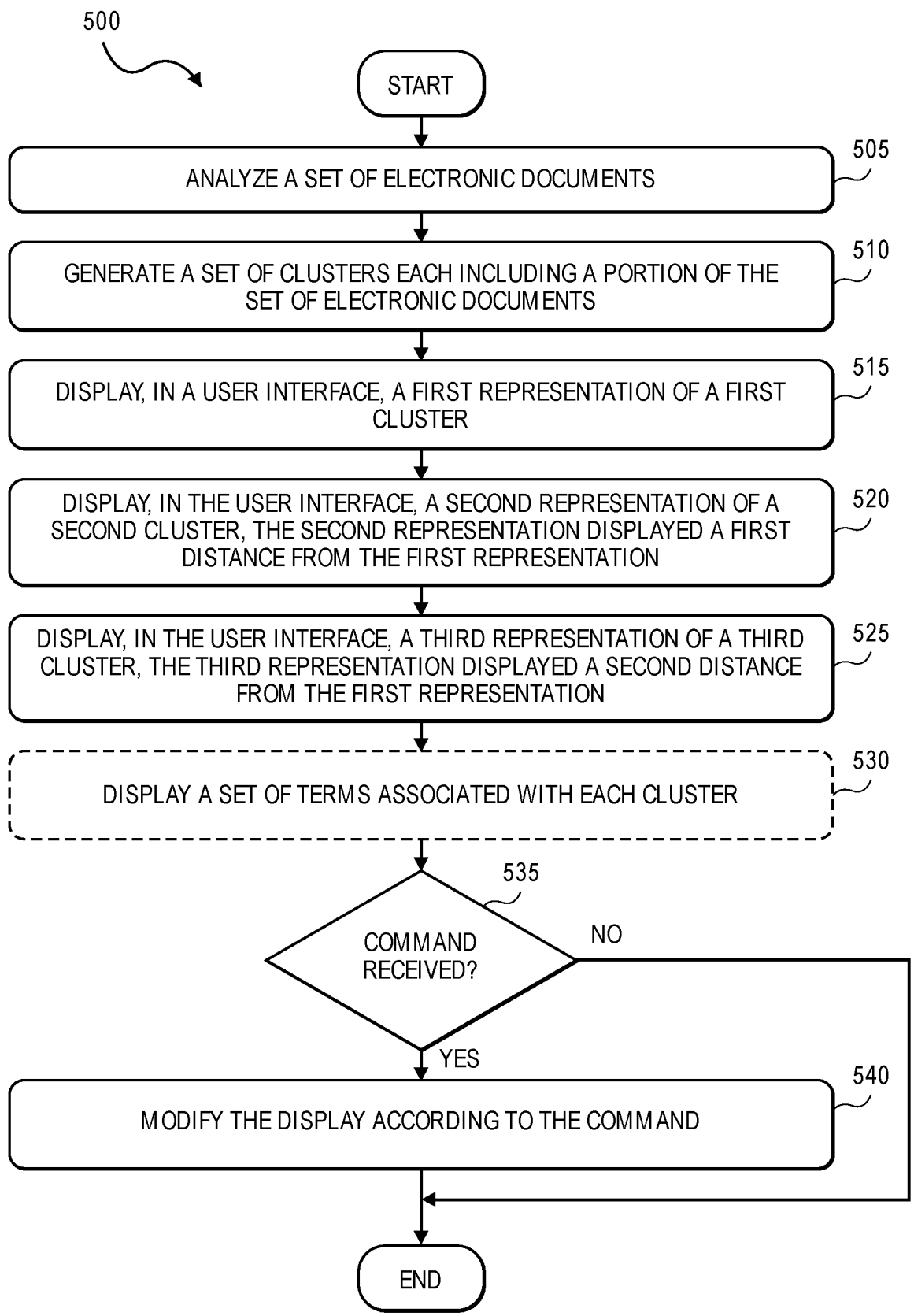
FIG. 5 is a flow diagram associated with generating data visualizations, in accordance with some embodiments.

FIG. 5 depicts a block diagram of an exemplary method 500 of generating data visualizations. The method 500 may be facilitated by an electronic device of a user (such as one of the electronic devices 110, 111, 112) that may communicate with one or more servers via a wireless network connection. In particular, the electronic device may request or retrieve data from the one or more servers that the electronic device may use to facilitate the method 500.

The method 500 may begin with the electronic device analyzing (block 505) a set of electronic documents. In embodiments, the electronic device may perform any type of indexing, processing, or analysis technique on the set of electronic documents, where the electronic device may identify a set of terms that are included in the set of electronic documents, and determine a set of groupings of the set of terms based on a set of similarities among the set of terms.

The electronic device may generate (block 510) a set of clusters each including a portion of the set of electronic documents. In embodiments, the electronic device may generate the set of clusters corresponding to the set of groupings, where each of the set of clusters may include the portion of the set of electronic documents according to a respective grouping of the set of groupings.

The electronic device may display (block 515), in a user interface, a first representation of a first cluster of the set of clusters. In embodiments, the first representation may have a first size that is indicative of an amount of the portion of the set of electronic documents that are included in the first cluster. Further, the electronic device may display the first representation in a center portion of the user interface.

The electronic device may display (block 520), in the user interface, a second representation of a second cluster of the set of clusters, where the second cluster may be displayed a first distance from the first representation. In embodiments, the second representation may have a second size that is indicative of an amount of the portion of the set of electronic documents that are included in the second cluster, and the first distance may be representative of a similarity between the portion of the set of electronic documents included in the first cluster and the portion of the set of electronic documents included in the second cluster.

The electronic device may display (block 525), in the user interface, a third representation of a third cluster of the set of clusters, where the third cluster may be displayed a second distance from the first representation. In embodiments, the third representation may have a third size that is indicative of an amount of the portion of the set of electronic documents that are included in the third cluster, and the second distance may be representative of a similarity between the portion of the set of electronic documents included in the first cluster and the portion of the set of electronic documents included in the third cluster. Further, in embodiments, the electronic device may display, in the user interface, (i) a first line object from the second representation of the second cluster to the first representation of the first cluster, and (ii) a second line object from the third representation of the third cluster to the first representation of the first cluster.

The electronic device may optionally display (block 530) a set of terms associated with each cluster. In particular, the electronic device may display, in the user interface for each of the first cluster, the second cluster, and the third cluster, the set of terms included in the grouping for that cluster.

At block 535, the electronic device may determine if a command is received, where the command may be received from a user via the user interface. If a command is not received ("NO"), processing may end, return to block 535, or proceed to other functionality. If a command is received ("YES"), the electronic device may determine which type of command is received and may modify (block 540) the display according to the command.

If the electronic device receives a selection to replace the first representation of the first cluster with the second representation of the second cluster, the electronic device may: determine a similarity between the portion of the set of electronic documents included in the second cluster and the portion of the set of electronic documents included in the third cluster, display, in the center portion of the user interface, the second representation of the second cluster, display, in the user interface, the first representation of the first cluster, where the first representation may be displayed the first distance from the second representation, and display, in the user interface, the third representation of the third cluster, where the third representation may be displayed a third distance from the second representation, the third distance representative of the similarity between the portion of the set of electronic documents included in the second cluster and the portion of the set of electronic documents included in the third cluster.

In an embodiment, the command may be a display modification adjustment that may be a similarity adjustment with a corresponding similarity metric, or a depth adjustment with a corresponding depth metric. If the command is a similarity adjustment, the electronic device may relocate, in the user interface, (i) the second cluster to a modified first distance from the first cluster according to the similarity metric, and (ii) the third cluster to a modified second distance from the first cluster according to the similarity metric.

If the command is a depth adjustment, the electronic device may access an additional cluster(s) that is a sub-cluster(s) of the second cluster or the third cluster. Further, the electronic device may display, in the user interface, a fourth representation of the additional cluster(s), the fourth representation having a fourth size indicative of an amount of the portion of the set of electronic documents included in the additional cluster(s), where the fourth representation may be displayed a fourth distance from the first representation, and where the fourth distance may be representative of a similarity between the portion of the set of electronic documents included in the first cluster and the portion of the set of electronic documents included in the additional cluster(s).

Figure 6:
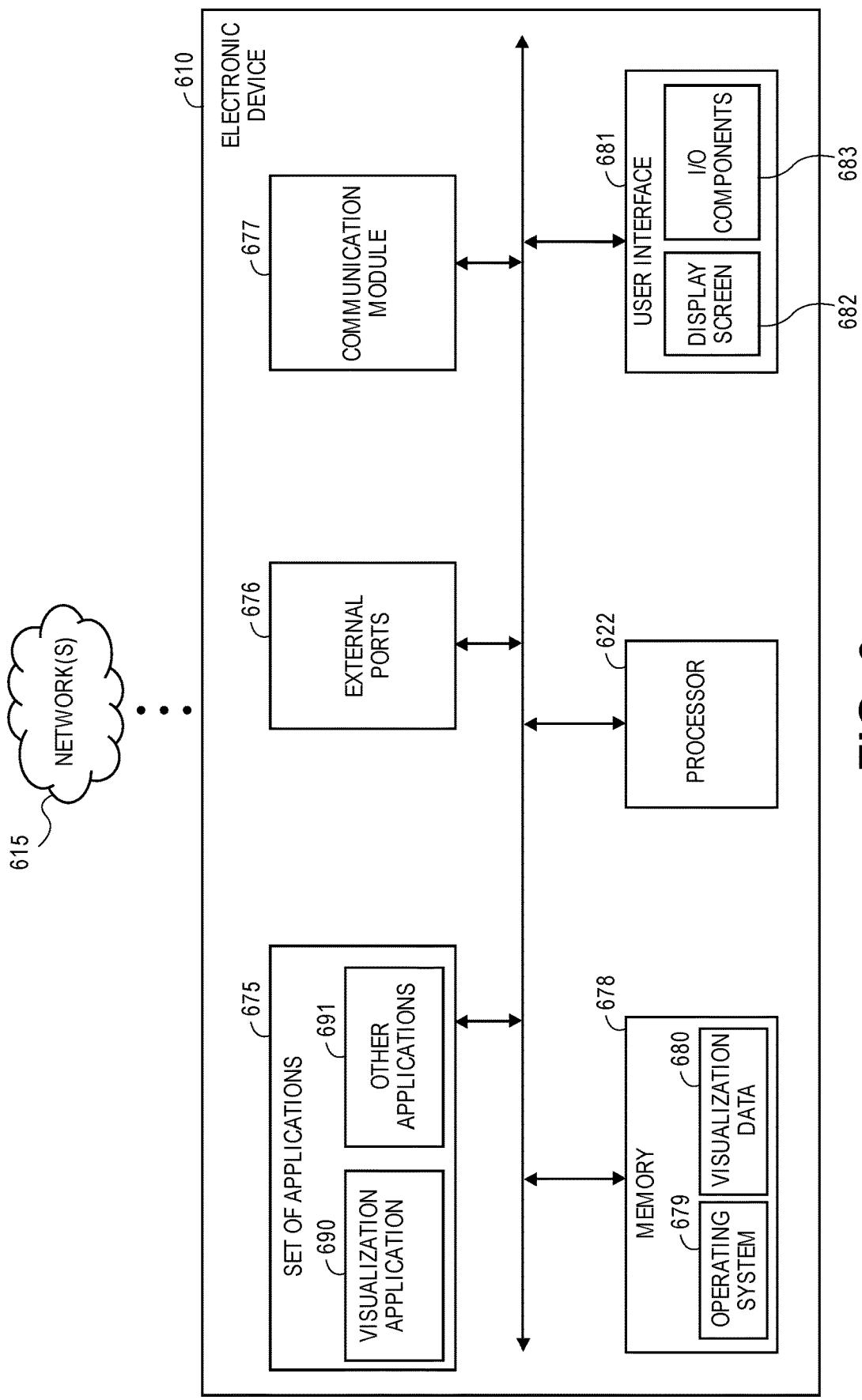
FIG. 6 is a block diagram of an exemplary electronic device, in accordance with some embodiments.

FIG. 6 illustrates a diagram of an exemplary electronic device 610 in which the functionalities as discussed herein may be implemented. It should be appreciated that the electronic device 610 may be configured to be connect to and communicate with various entities, components, and devices, as discussed herein. In one implementation, the electronic device 610 may be a portable device, such as one of thes electronic devices 110, 111, 112 as discussed with respect to FIG. 1. In another implementation, the electronic device 610 may be a server, such as one of the servers 104, 106 as discussed with respect to FIG. 1.

The electronic device 610 may include a processor 622 as well as a memory 678. The memory 678 may store an operating system 679 capable of facilitating the functionalities as discussed herein as well as a set of applications 675 (i.e., machine readable instructions). For example, one of the set of applications 675 may be a visualization application 690 configured to generate and/or facilitate the display of data visualizations. It should be appreciated that one or more other applications 691 are envisioned.

The processor 622 may interface with the memory 678 to execute the operating system 679 and the set of applications 675. According to some embodiments, the memory 678 may also store visualization data 680 that may indicate certain characteristics associated with data visualizations, such as display characteristics of document clusters. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 610 may further include a communication module 677 configured to communicate data via one or more networks 615. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676.

The electronic device 610 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 610 via the user interface 681 to review information and/or perform other functions.

In some embodiments, the electronic device 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of generating data visualizations, the method comprising:
   accessing a set of clusters, wherein each of the set of clusters includes a portion of a set of electronic documents;
   displaying, in a user interface, a first representation of a first cluster of the set of clusters, the first representation having a first size indicative of an amount of the portion of the set of electronic documents included in the first cluster;
   displaying, in the user interface, a second representation of a second cluster of the set of clusters, the second representation having a second size indicative of an amount of the portion of the set of electronic documents included in the second cluster, the second representation displayed a first distance from the first representation, the first distance representative of a similarity between the portion of the set of electronic documents included in the first cluster and the portion of the set of electronic documents included in the second cluster;
   displaying, in the user interface, a third representation of a third cluster of the set of clusters, the third representation having a third size indicative of an amount of the portion of the set of electronic documents included in the third cluster, the third representation displayed a second distance from the first representation, the second distance representative of a similarity between the portion of the set of electronic documents included in the first cluster and the portion of the set of electronic documents included in the third cluster;
   accessing an additional cluster that is a sub-cluster of the second cluster;
   displaying, in the user interface, a fourth representation of the additional cluster within the second representation of the second cluster, the fourth representation having a fourth size indicative of an amount of the portion of the set of electronic documents included in the additional cluster, the fourth representation displayed a fourth distance from the first representation, the fourth distance representative of a similarity between the portion of the set of electronic documents included in the first cluster and the portion of the set of electronic documents included in the additional cluster;
   displaying, in the user interface, a first line object as a first radial line from the first representation of the first cluster through the second representation of the second cluster and the fourth representation of the additional cluster; and
   displaying, in the user interface, a second line object as a second radial line from the first representation of the first cluster through the third representation of the third cluster, wherein the second representation and the third representation at least partially surround the first representation.

2. The computer-implemented method of claim 1, wherein displaying the first representation of the first cluster of the set of clusters comprises:
   displaying the first representation in a center portion of the user interface.

3. The computer-implemented method of claim 2, further comprising:
   receiving a selection to replace the first representation of the first cluster with the second representation of the second cluster;
   determining a similarity between the portion of the set of electronic documents included in the second cluster and the portion of the set of electronic documents included in the third cluster;
   displaying, in the center portion of the user interface, the second representation of the second cluster;
   displaying, in the user interface, the first representation of the first cluster, the first representation displayed the first distance from the second representation; and
   displaying, in the user interface, the third representation of the third cluster, the third representation displayed a third distance from the second representation, the third distance representative of the similarity between the portion of the set of electronic documents included in the second cluster and the portion of the set of electronic documents included in the third cluster.

4. The computer-implemented method of claim 1, further comprising:
   analyzing, by a computer processor, the set of electronic documents including:
      identifying a set of terms that are included in the set of electronic documents,
      determining a set of groupings of the set of terms based on a set of similarities among the set of terms, and
      generating the set of clusters corresponding to the set of groupings, each of the set of clusters including the portion of the set of electronic documents according to a respective grouping of the set of groupings.

5. The computer-implemented method of claim 4, further comprising:
   displaying, in the user interface for each of the first cluster, the second cluster, and the third cluster, the set of terms included in the grouping for that cluster.

6. The computer-implemented method of claim 1, further comprising:
   receiving a display modification selection via the user interface; and
   modifying, in the user interface according to the display modification selection, display of at least one of the second representation of the second cluster and the third representation of the third cluster.

7. The computer-implemented method of claim 6, wherein receiving the display modification selection comprises receiving a similarity adjustment with a corresponding similarity metric, and wherein modifying the display comprises:
   relocating, in the user interface, (i) the second cluster to a modified first distance from the first cluster according to the similarity metric, and (ii) the third cluster to a modified second distance from the first cluster according to the similarity metric.

8. The computer-implemented method of claim 1, wherein accessing the set of clusters comprises:
   sending, to a server, a query comprising a set of parameters; and
   receiving, from the server, data indicative of the set of clusters and reflective of the set of parameters of the query.

9. A system configured to generate data visualizations, comprising:
   a user interface;
   a memory configured to store non-transitory computer executable instructions; and a processor interfacing with the user interface and the memory, and configured to execute the non-transitory computer executable instructions to cause the processor to:
  access a set of clusters, wherein each of the set of clusters includes a portion of a set of electronic documents,
  cause the user interface to display an indication of a percentage of the set of electronic documents that are clustered,
  cause the user interface to display a first representation of a first cluster of the set of clusters, the first representation having a first size indicative of an amount of the portion of the set of electronic documents included in the first cluster,
  cause the user interface to display a second representation of a second cluster of the set of clusters, the second representation having a second size indicative of an amount of the portion of the set of electronic documents included in the second cluster, the second representation displayed a first distance from the first representation, the first distance representative of a similarity between the portion of the set of electronic documents included in the first cluster and the portion of the set of electronic documents included in the second cluster,
  cause the user interface to display a third representation of a third cluster of the set of clusters, the third representation having a third size indicative of an amount of the portion of the set of electronic documents included in the third cluster, the third representation displayed a second distance from the first representation, the second distance representative of a similarity between the portion of the set of electronic documents included in the first cluster and the portion of the set of electronic documents included in the third cluster,
  access an additional cluster that is a sub-cluster of the second cluster or the third cluster,
  cause the user interface to display a fourth representation of the additional cluster within the second representation of the second cluster, the fourth representation having a fourth size indicative of an amount of the portion of the set of electronic documents included in the additional cluster, the fourth representation displayed a fourth distance from the first representation, the fourth distance representative of a similarity between the portion of the set of electronic documents included in the first cluster and the portion of the set of electronic documents included in the additional cluster,
  cause the user interface to display a first line object as a first radial line from the first representation of the first cluster through the second representation of the second cluster and the fourth representation of the additional cluster, and
  cause the user interface to display a second line object as a second radial line from the first representation of the first cluster through the third representation of the third cluster, wherein the second representation and the third representation at least partially surround the first representation.

10. The system of claim 9, wherein to cause the user interface to display the first representation of the first cluster of the set of clusters, the processor is configured to:
  cause the user interface to display the first representation in a center portion of the user interface.

11. The system of claim 10, wherein the processor is further configured to:
  receive, via the user interface, a selection to replace the first representation of the first cluster with the second representation of the second cluster,
  determine a similarity between the portion of the set of electronic documents included in the second cluster and the portion of the set of electronic documents included in the third cluster,
  cause the user interface to display, in the center portion of the user interface, the second representation of the second cluster,
  cause the user interface to display the first representation of the first cluster, the first representation displayed the first distance from the second representation, and
  cause the user interface to display the third representation of the third cluster, the third representation displayed a third distance from the second representation, the third distance representative of the similarity between the portion of the set of electronic documents included in the second cluster and the portion of the set of electronic documents included in the third cluster.

12. The system of claim 9, wherein the processor is further configured to:
  analyze the set of electronic documents including:
    identify a set of terms that are included in the set of electronic documents,
    determine a set of groupings of the set of terms based on a set of similarities among the set of terms, and
    generate the set of clusters corresponding to the set of groupings, each of the set of clusters including the portion of the set of electronic documents according to a respective grouping of the set of groupings.

13. The system of claim 12, wherein the processor is further configured to:
  cause the user interface to display, for each of the first cluster, the second cluster, and the third cluster, the set of terms included in the grouping for that cluster.

14. The system of claim 9, wherein the processor is further configured to:
  receive, via the user interface, a display modification selection via the user interface, and
  cause the user interface to modify, according to the display modification selection, display of at least one of the second representation of the second cluster and the third representation of the third cluster.

15. The system of claim 14, wherein the display modification selection is a similarity adjustment with a corresponding similarity metric, and wherein to cause the user interface to modify the display, the processor is configured to:
  cause the user interface to relocate (i) the second cluster to a modified first distance from the first cluster according to the similarity metric, and (ii) the third cluster to a modified second distance from the first cluster according to the similarity metric.

16. The system of claim 9, wherein to access the set of clusters, the processor is configured to:
  send, to a server via a transceiver, the query comprising a set of parameters, and
receive, from the server via the transceiver, data indicative of the set of clusters and reflective of the set of parameters of the query.

* * * * *